United States Patent
Lazarski et al.

(10) Patent No.: US 7,424,028 B2
(45) Date of Patent: Sep. 9, 2008

(54) CABLE MODEM FOR CONNECTING CUSTOMER PREMISES EQUIPMENT AND METHOD OF CONTROLLING FLOW OF DATA BETWEEN CABLE MODEM AND CUSTOMER PREMISES EQUIPMENT

(75) Inventors: Wojciech Lazarski, Głogów (PL); Maciej Michalczak, Zielona Góra (PL); Roman Ślipko, Jasień (PL)

(73) Assignees: Advanced Digital Broadcast Polska SP. Z O.O., Zielona Góra (PL); Advanced Digital Broadcast Ltd., Taipei (TW)

( * ) Notice: Subject to any disclaimer, the term of this patent is extended or adjusted under 35 U.S.C. 154(b) by 752 days.

(21) Appl. No.: 10/712,476

(22) Filed: Nov. 13, 2003

(65) Prior Publication Data

US 2004/0109469 A1 Jun. 10, 2004

(30) Foreign Application Priority Data

Nov. 15, 2002 (PL) ................................. 357152

(51) Int. Cl.
*H04L 12/28* (2006.01)
*H04L 12/56* (2006.01)
*G01R 31/08* (2006.01)
*H04L 12/54* (2006.01)

(52) U.S. Cl. ................. 370/422; 370/229; 370/230; 370/231; 370/235; 370/389; 370/413; 370/423; 370/428; 370/429

(58) Field of Classification Search .................. None
See application file for complete search history.

(56) References Cited

U.S. PATENT DOCUMENTS

| | | | | |
|---|---|---|---|---|
| 6,137,793 A * | 10/2000 | Gorman et al. | ............. | 370/360 |
| 6,195,591 B1 * | 2/2001 | Nixon et al. | ................. | 700/83 |
| 6,310,862 B1 * | 10/2001 | Roy | ........................... | 370/260 |
| 6,618,386 B1 * | 9/2003 | Liu et al. | .................... | 370/401 |
| 6,738,353 B2 * | 5/2004 | Chong | ........................ | 370/241 |
| 7,007,296 B2 * | 2/2006 | Rakib | ........................ | 725/111 |
| 7,107,312 B2 * | 9/2006 | Hackbarth et al. | ......... | 709/204 |

FOREIGN PATENT DOCUMENTS

EP 1 109 355 A2 6/2001

* cited by examiner

*Primary Examiner*—Edan Orgad
*Assistant Examiner*—Blanche Wong
(74) *Attorney, Agent, or Firm*—Matthias Scholl P.C.; Matthias Scholl

(57) ABSTRACT

A cable modem for connecting Customer Premises Equipment (CPE) includes a Media Access Control (MAC) layer controller, a Logical Link Control (LLC) bridge (113) interacting with the MAC layer controller, an IP stack processing IP frames and interacting with the LLC bridge (113), CPE interfaces (115, 116 and 117) and a multiplexer (114) of Customer Premises Equipment (CPE) interfaces linked to the CPE interfaces and to the LLC bridge (113). The CPE interfaces (115, 116 and 117) communicate with the multiplexer (114) through appropriate functions. The multiplexer (114) has functionality allowing for servicing the flow of frames between the cable network and the interfaces linked to it, directing the received frames to appropriate interfaces.

6 Claims, 13 Drawing Sheets

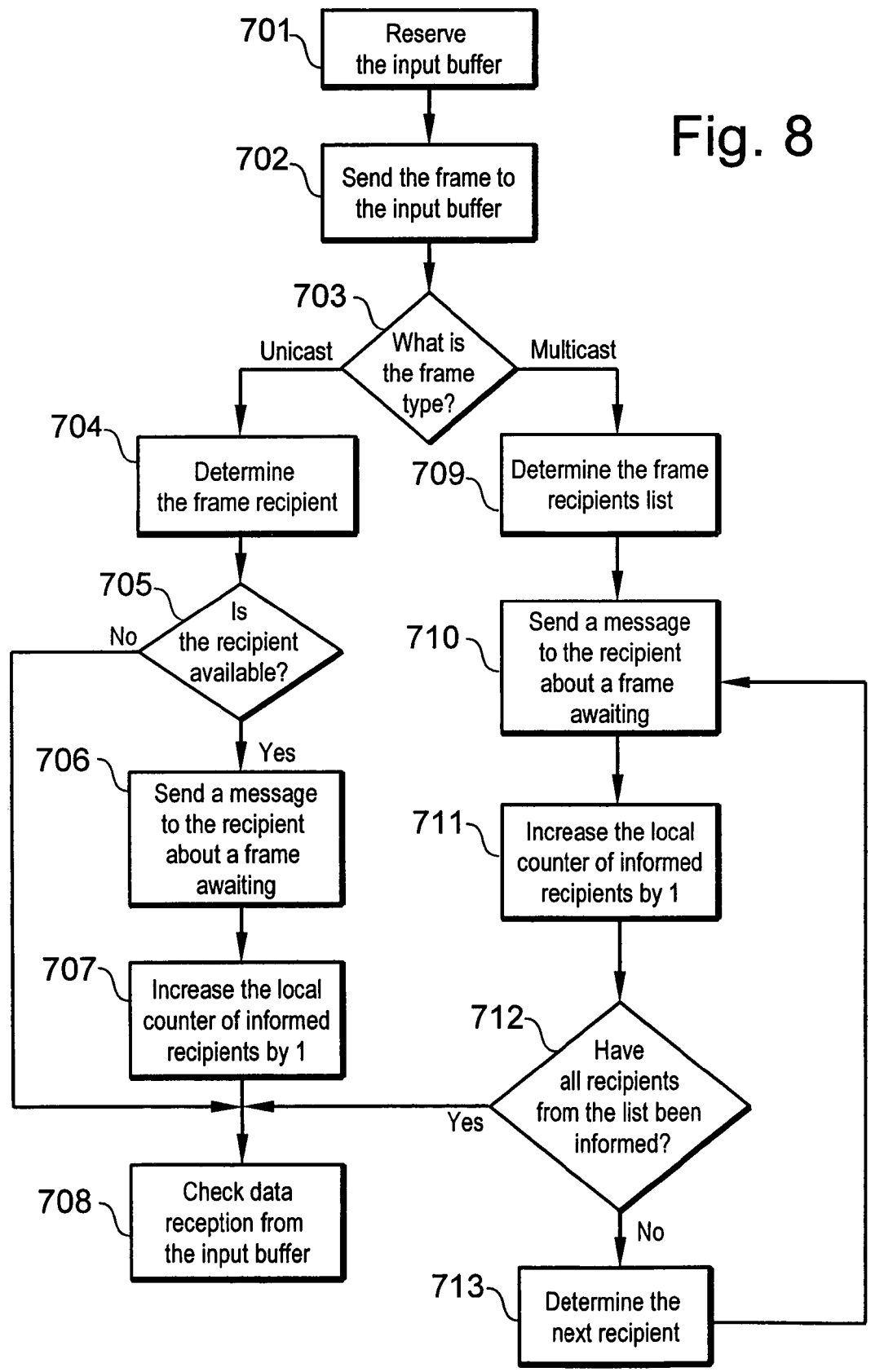

CABLE MODEM FOR CONNECTING CUSTOMER PREMISES EQUIPMENT AND METHOD OF CONTROLLING FLOW OF DATA BETWEEN CABLE MODEM AND CUSTOMER PREMISES EQUIPMENT

CROSS-REFERENCE TO RELATED APPLICATIONS

This application claims priority to Polish Application No. P-357152, filed Nov. 15, 2002, the contents of which are incorporated herein by reference.

BACKGROUND OF THE INVENTION

1. Field of the Invention

The present invention relates to a cable modem for connecting Customer Premises Equipment (CPE) and a method of controlling flow of data between the cable modem and the Customer Premises Equipment (CPE).

2. Brief Description of the Background of the Invention Including Prior Art

Broadband modems, such as cable and xDSL modems are well known and in common use. Cable modem operation/is defined by the Data-Over-Cable Service Interface Specifications (DOCSIS).

Currently used modems have a functionality of servicing a single interface of a given Customer Premises Equipment (CPE). An example of a cable modem is described in the European patent application No. EP 1 109 355 A2 entitled "Cable modem link layer bridge". It is a typical modem, servicing only a single interface. Being limited to connecting only a single interface (for instance an Ethernet port), a user may choose to connect a multiplexer such as an Ethernet hub, which will allow for connecting multiple devices. This approach is limiting in that it only allows for connecting devices through the Ethernet link. Similarly, it can be a USB port, which allows the user to connect various USB devices through a USB hub. What can be noticed from this example, however, is that the user is limited to a single type of connection, such as the Ethernet or the USB connection.

SUMMARY OF THE INVENTION

Purposes of the Invention

It is an object of this invention to provide a cable modem for linking various devices.

It is another object of this invention to provide a method of controlling flow of data between the modem and various devices.

These and other objects and advantages of the present invention will become apparent from the detailed description, which follows.

Brief Description of the Invention

A cable modem for connecting Customer Premises Equipment (CPE) according to the present invention includes a Media Access Control (MAC) layer controller, a Logical Link Control (LLC) bridge interacting with the MAC layer controller, an IP stack processing IP frames and interacting with the LLC bridge, CPE interfaces, in which one interface is linked to one device of Customer Premises Equipment and a multiplexer of Customer Premises Equipment (CPE) interfaces linked to the CPE interfaces and to the LLC bridge. The multiplexer has a table of the CPE interfaces linked to the multiplexer with data related to the CPE interfaces, the data being used by an identification function to determine an addressed interface chosen from the CPE interfaces, to which a frame with a specific receiver physical address is directed. Furthermore, the multiplexer has a table with MAC addresses of devices of the CPE and identifiers of the CPE interfaces to which of the devices of the CPE are linked, where an interface identifier, to which device of the CPE with a specific MAC address is connected, is determined by a check-and-associate function, and records to the table with MAC addresses are added using an adding function, which analyses commands sent by the interfaces. The multiplexer enables transfer of data between the LLC bridge and one of the CPE interfaces. Each of the CPE interfaces can be an interface of a physical CPE and controls flow of data between the multiplexer and a CPE driver or an interface of a virtual CPE being an application and operates dependent on received frames and controls flow of data between the multiplexer and the application. The table of the CPE interfaces comprises a name of the device of the CPE, an ID number of the device of the CPE and a MAC address of the device of the CPE.

In another aspect of the present invention, a method for controlling flow of data between a cable modem and CPE linked to the cable modem equipped with a multiplexer of CPE interfaces having an input buffer and an output buffer includes the steps of providing the multiplexer of CPE interfaces with a table of interfaces comprising data enabling identification of the interfaces by MAC addresses and using the table of the CPE interfaces by an identifying function to determine an identifier of each CPE interface, to which a frame with a specific receiver MAC address is to be transmitted. Furthermore, the method can include the steps of transmitting outgoing data from the cable modem through the CPE interface to the output buffer, checking if the outgoing data is directed to another interface, reserving the input data, sending the data to the input buffer when the data is directed to another interface, canceling the reservation of the input buffer when the outgoing data is received from the input buffer by all CPE interfaces, to which it was directed and sending information to the LLC bridge about the outgoing data in the output buffer directed to the LLC bridge as well as reserving the input buffer, transmitting the incoming data through the LLC bridge to the input buffer, canceling the reservation of this buffer when the incoming data is received from the input buffer by all interfaces, to which it was directed. The method can also include controlling the input buffer by creating a list of recipient CPE interfaces to which the frame is directed, informing the recipient CPE interfaces about the frame in the input buffer, increasing by one a counter of informed recipients for each informed recipient CPE interfaces and increasing by one a counter frame receipts when recipient CPE interfaces receive the frame from the buffer and determining that the data is received by all recipient CPE interfaces when the counter of received frames reaches the counter of informed recipients.

The novel features, which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings one of the possible embodiments of the present invention is shown, where

FIGS. 7A, 7, 7C, 8, and 9 show a flow chart of dataflow through a system;

DESCRIPTION OF INVENTION AND PREFERRED EMBODIMENT

Figure 1:
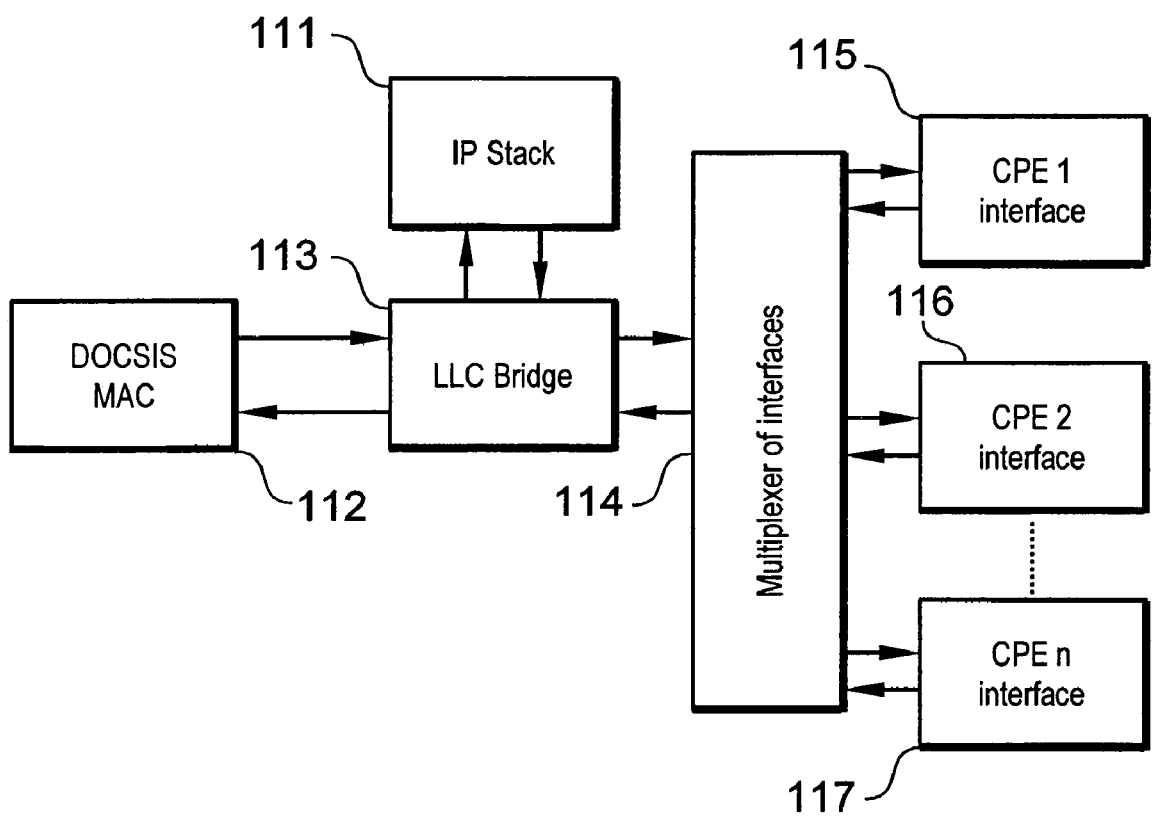
FIG. 1 is a block diagram of a cable modem with a multiplexer.

FIG. 1 shows a structure of a cable modem, the LLC bridge 113 of which, is connected to the multiplexer 114 of CPE interfaces 115, 116 and 117. Any number of interfaces 115, 116, 117 of devices can be linked to the multiplexer 114. They communicate with the multiplexer 114 through appropriate functions. The multiplexer 114 has functionality allowing for servicing the flow of frames between the cable network and the interfaces linked to it, directing the received frames to appropriate interfaces.

Figure 2:
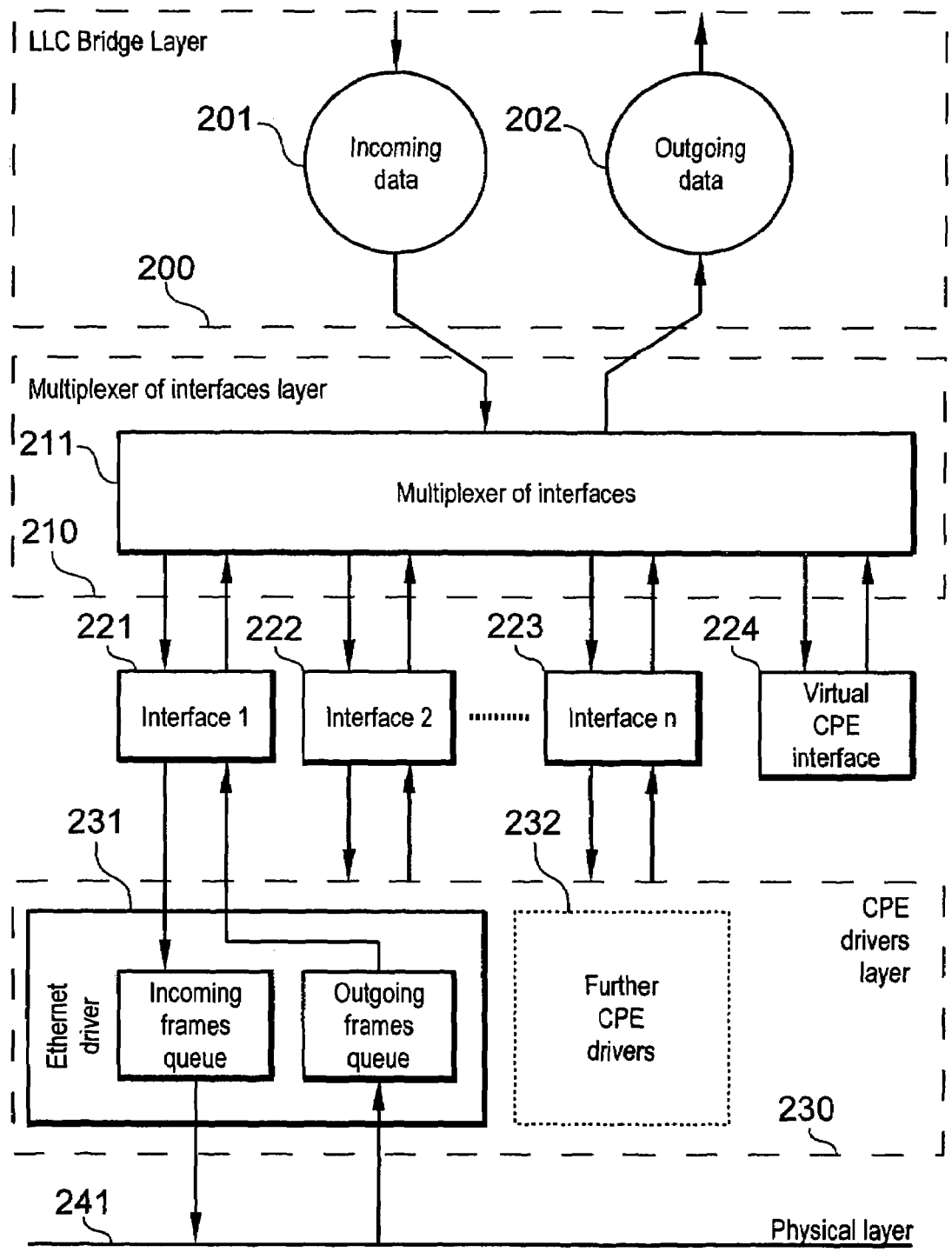
FIG. 2 shows flow of frames through layers of a modem with a multiplexer.

The dataflow in the cable modem, between the cable network and the CPE, is presented in FIG. 2, which shows the LLC bridge layer 200, the multiplexer of interfaces layer 210, the CPE driver layer 230 and the physical layer 241. The LLC bridge manages the incoming data 201 and the outgoing data 202. The incoming data 201 and the outgoing data 202 are transmitted through the multiplexer of interfaces 211, to which the individual CPE interfaces 221, 222, 223 and 224 are connected. The CPE interfaces provide communication functions between the device driver and the multiplexer. The data is next transmitted through the drivers 231 and 232 of the individual devices. One of these may, for instance, be the Ethernet driver 231, which services the queues of incoming and outgoing frames. The Ethernet driver 231 of a device connects with the physical layer 241 of that device. The interfaces of virtual devices need not be connected to the physical layer, due to the fact that these devices may be applications servicing specified types of transmitted frames. These applications may, for example, perform diagnostic functions.

Figure 3:
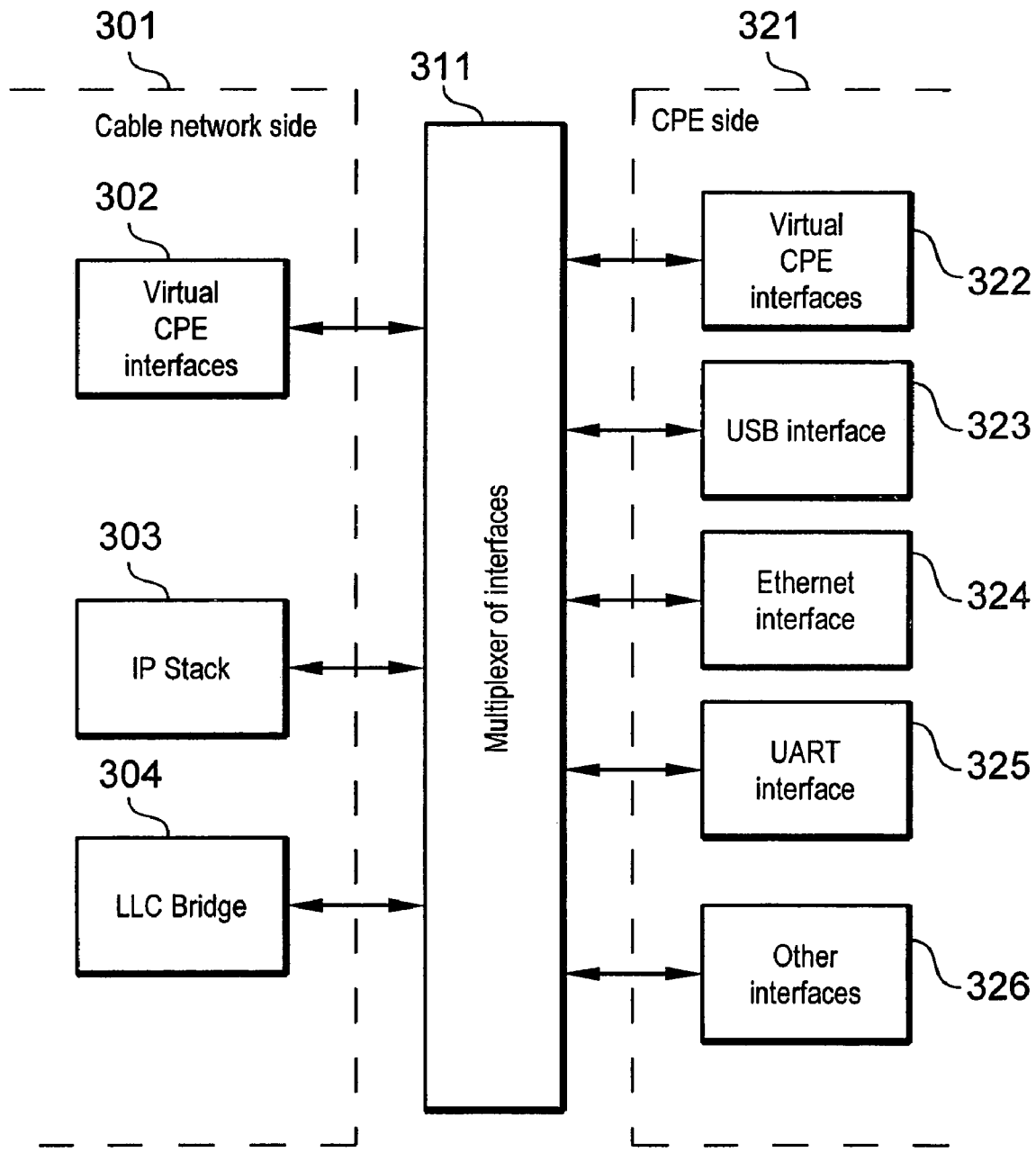
FIG. 3 shows multiplexer connections with a cable network side and a CPE part.

The diagram of the multiplexer of interfaces and its connections with the cable network side 301 and the CPE side 302 is shown in FIG. 3. From the cable network side 301, the multiplexer 311 of interfaces communicates with the LLC bridge 304, the IP stack 303, or alternatively with the virtual CPE interfaces which, for example, can be used to service control frames flowing through the system. From the CPE side 321, interfaces of various devices can be connected. These include, for example, the virtual devices interfaces 322, the USB interface 323, the Ethernet interface 324, the UART interface 325, or interfaces 326 of any other devices used by the user. The only limitation is the necessity for the interface to be registered in the system by making available its data and functions servicing the communication between the multiplexer of interfaces and the device driver.

The data in the presented embodiment are transmitted as Ethernet frames. Two types of frames can be transmitted through the system: data frames and control frames.

Figure 4:
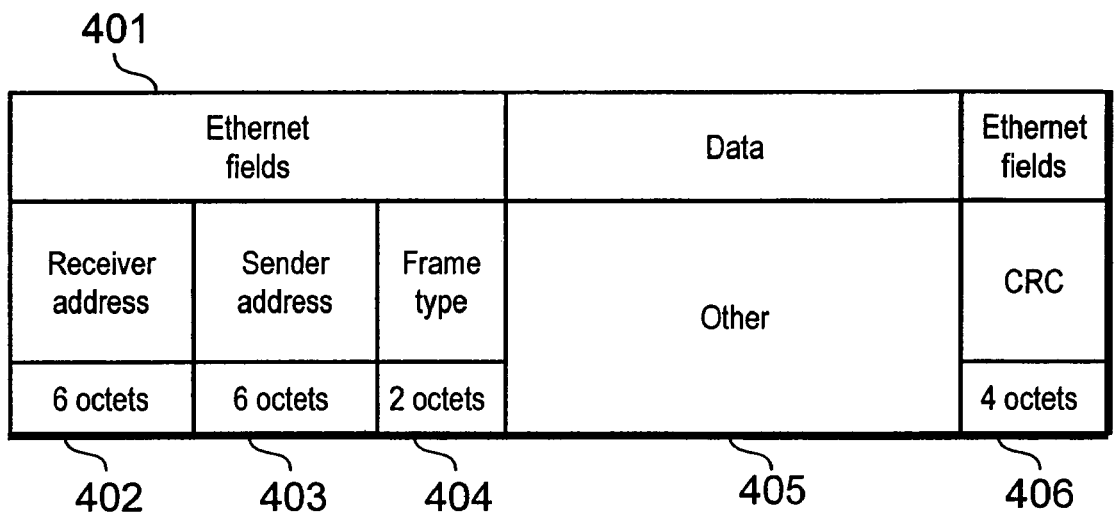
FIGS. 4 and 5 show a format of Ethernet frames sent through a system.

An example of a format of a data frame 401 is shown in FIG. 4. The data frames 401 are typical Ethernet frames. They contain the addresses of the receiver 402 and the sender 403, the frame type 404, the data 405 of variable length, as well as the control sum CRC field 406. These frames are in standard use by all interfaces.

Figure 5:
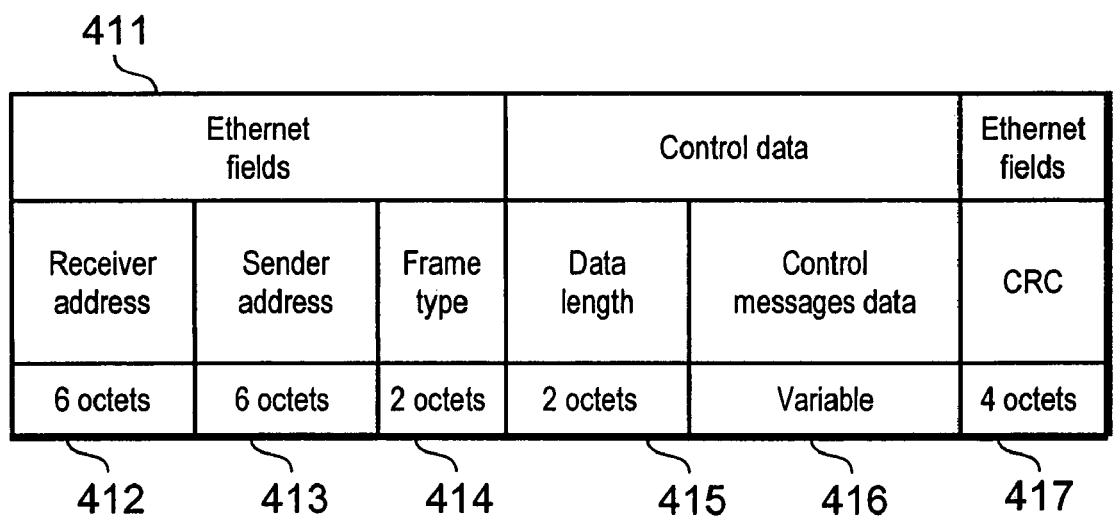

FIG. 5, in turn, shows an example of a format of a control frame 411. The control frames 411, shown here are also Ethernet fields. These also contain the addresses of the receiver 412, and the sender 413, the frame type 414, the control data block—comprising a field determining the length of these data 415 and the control information data themselves 416, and the control sum CRC field 417. The control frames 411 are transmitted between the interfaces of the virtual devices, as well as of the physical ones. A satellite television decoder may, for example, use control frames to appropriately control a cable modem. There exists an option that allows for blocking the flow of control frames through individual CPEs, so they will not be transmitted to external devices.

In order to enable the use of a given device, its interface—i.e. the set of functions enabling communication between the multiplexer of interfaces and the device—should be registered in the system. The interface is registered using an appropriate function, which registers the parameters of that interface in the table of interfaces. An example of a structure defining parameters of an interface is shown below.

```
typedef struct
{
    char        *device_name
                /*interface name*/
    device      device_id
                /*unique interface identifier*/
    address     device_mac_address
                /*interface MAC address*/
    flag        device_flag
                /*status flag: active/inactive*/
    flag        device_control_flag
                /*accepting/rejecting control frames flag*/
    transmit_f  transmit
                /*frame sending function*/
    UpDown_f    UpDown
                /*status flag controlling function*/
    long        sent_packets
                /*number of frames sent by the interface*/
    long        receive_packets
                /*number of frames received by the interface*/
} device_handle
```

Following system startup, consecutive interfaces are initialized. During the initialization, a table, associating interface identifiers with MAC addresses allocated to them, is created. The MAC (Media Access Control) addresses are identify a given device in the Media Access Control layer. This is the layer controlling the low-level devices protocols. According to the Open System Interface (OSI) network model, the MAC and LLC (Logical Link Control) layers together form the DLC (Data Link Control) layer.

An example of a structure of a table associating interfaces identifiers and MAC addresses assigned to them is shown below. The table is further referred-to as the MAC/CPE table.

| Device MAC address | Interface identifier |
|---|---|
| Device 1 (MAC1) | Interface of device 1 |
| Device 2 (MAC2) | Interface of device 2 |
| Device 3 (MAC3) | Interface of device 3 |
| Device 31 (MAC31) | Interface of device 3 |
| Device 32 (MAC32) | Interface of device 3 |
| ... | ... |

There is yet another table created in the system. This is the table of interfaces. Its columns determine interfaces parameters given during the registration of the interface in the interface structure. These are, for example, the name of the CPE, its ID number, and its MAC address. The interface table stores only data concerning registered interfaces. Interfaces are registered by invoking a function, which reads the structure of the data (struct device_handle) as a parameter and stores it in the interface table.

Additional devices may be connected to a single CPE interface. Several PC computers can be connected to an Ethernet interface through a hub. Each of these computers has its own MAC address. Devices may transmit control frames—for example ARP (Address Resolution Protocol) frames—during system initialization or its operation. These frames pass through an appropriate device interface. This interface transmits them further to the output buffer, from where they are fetched by the bridge. An appropriate function monitors the frames coming in to the output buffer, reads the MAC addresses of the sender and the interface identifier of the device the given frame originated from. The function next checks whether the given MAC address is present the interfaces table. If the given MAC address is not found, the function adds information, regarding the correlation of the MAC address with an interface identifier, to the table. During further system operation, upon the appearance of frames destined for a given MAC address, this address will be associated with an appropriate device interface identifier, and the frame will be sent to that device.

Figure 6:
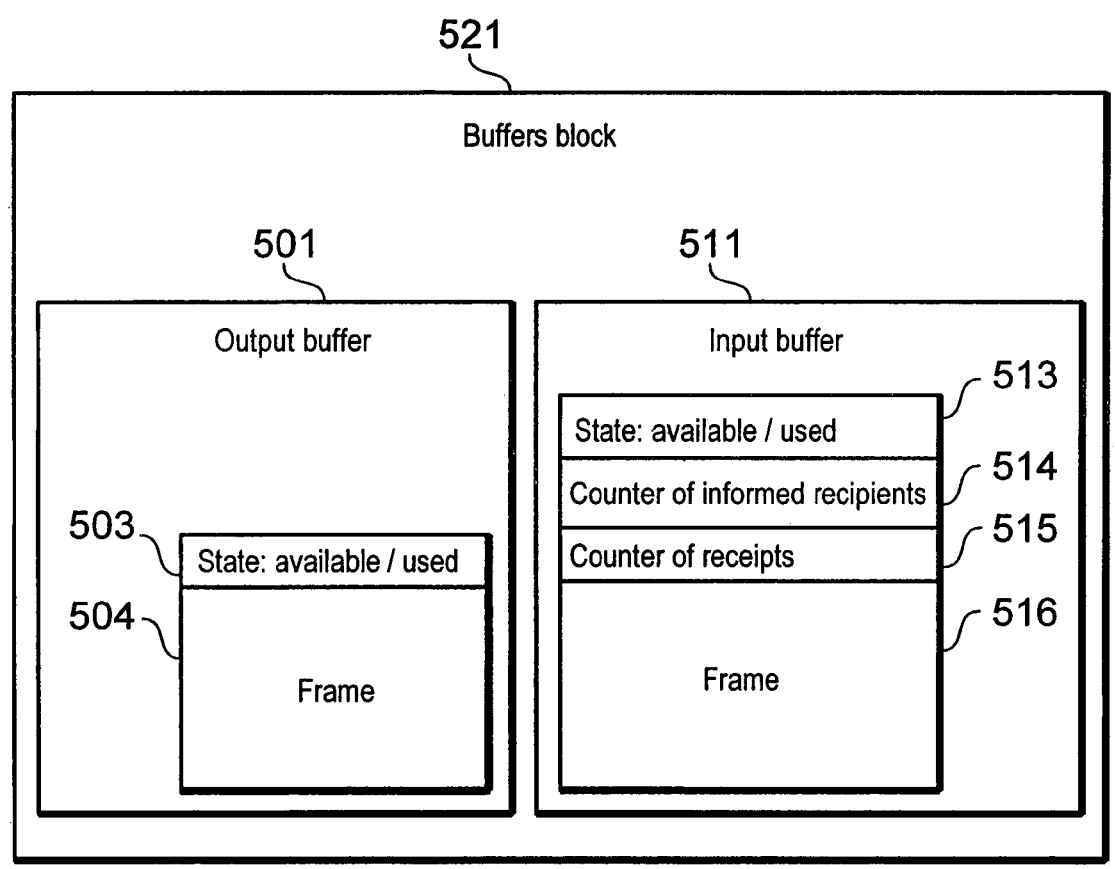
FIG. 6 shows a structure of multiplexer input and output buffers.

Sending and receiving of the data is accomplished with the help of the buffers block 521, comprising an output buffer 501 and an input buffer 511. The structure and operation of these buffers is shown in FIG. 6. The device interface copies into the output buffer 501 data addressed to the bridge, where they are stored until the bridge transmits them to the MAC controller or to the IP stack. The output buffer 501 contains memory chunks reserved for designating the status 503 and for the frame 504. The output buffer is reserved by the interface of the device, and released by the bridge or by the multiplexer of interfaces. The multiplexer of interfaces or the bridge copy to the input buffer 511 data destined for the device interfaces, and these data are stored there until all the interfaces addressed to receive them do so. Every input buffer has its own two counters: the counter 514 of recipients informed that there is a frame waiting in the buffer and the counter 515 of the number of frame receipts from the buffer. At the time when the counter of informed recipients 514 and the counter 515 of receipts are equal, the input buffer 511 can be released by the multiplexer, and used again. Besides the chunks used for the counters, the input buffer 511 also contains memory chunks reserved for designating the buffer status 513 and the frame 516. The input buffer is reserved by the multiplexer of interfaces or by the bridge. It is released by the multiplexer of interfaces.

Figure 7A:
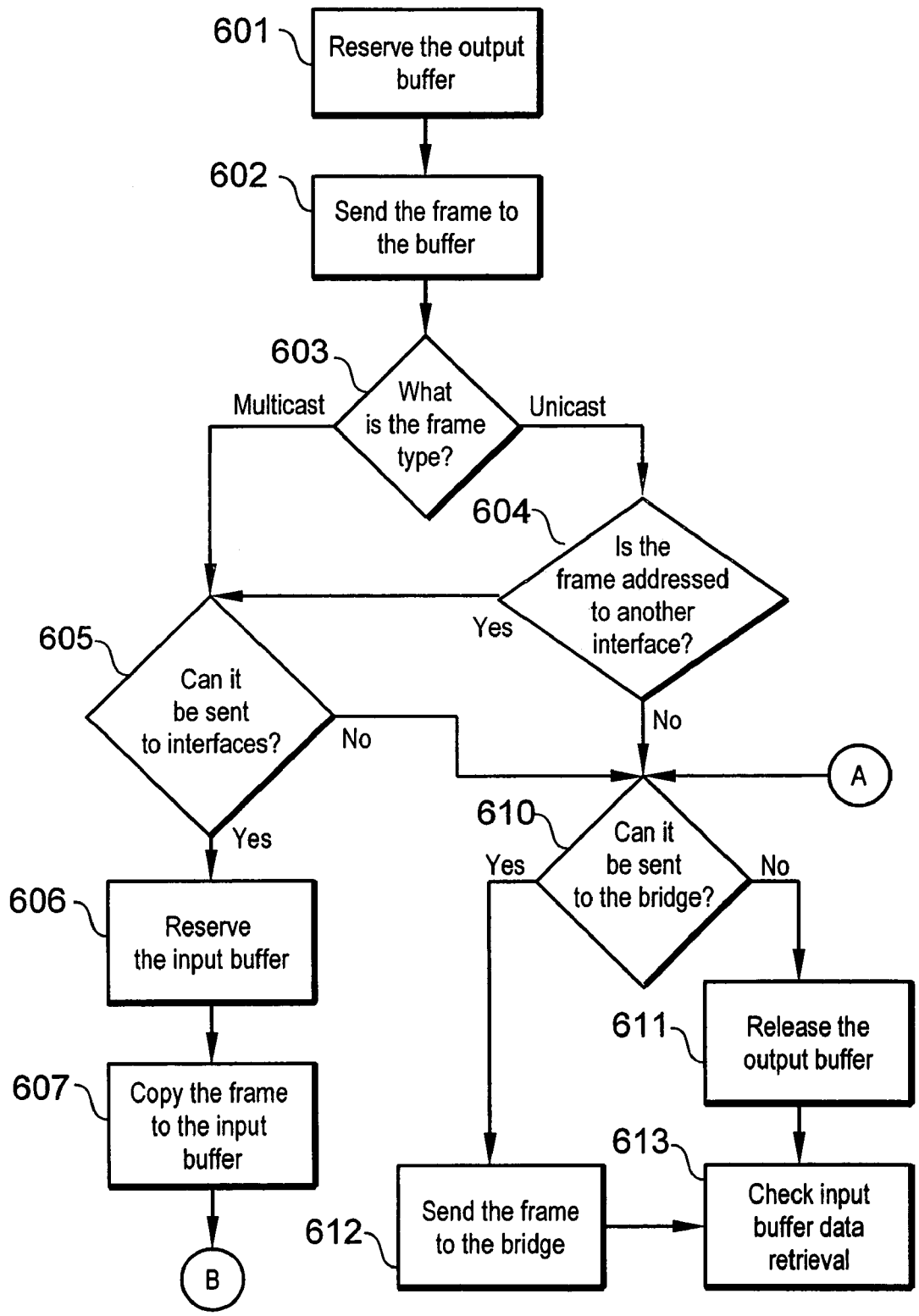
Figure 7B:
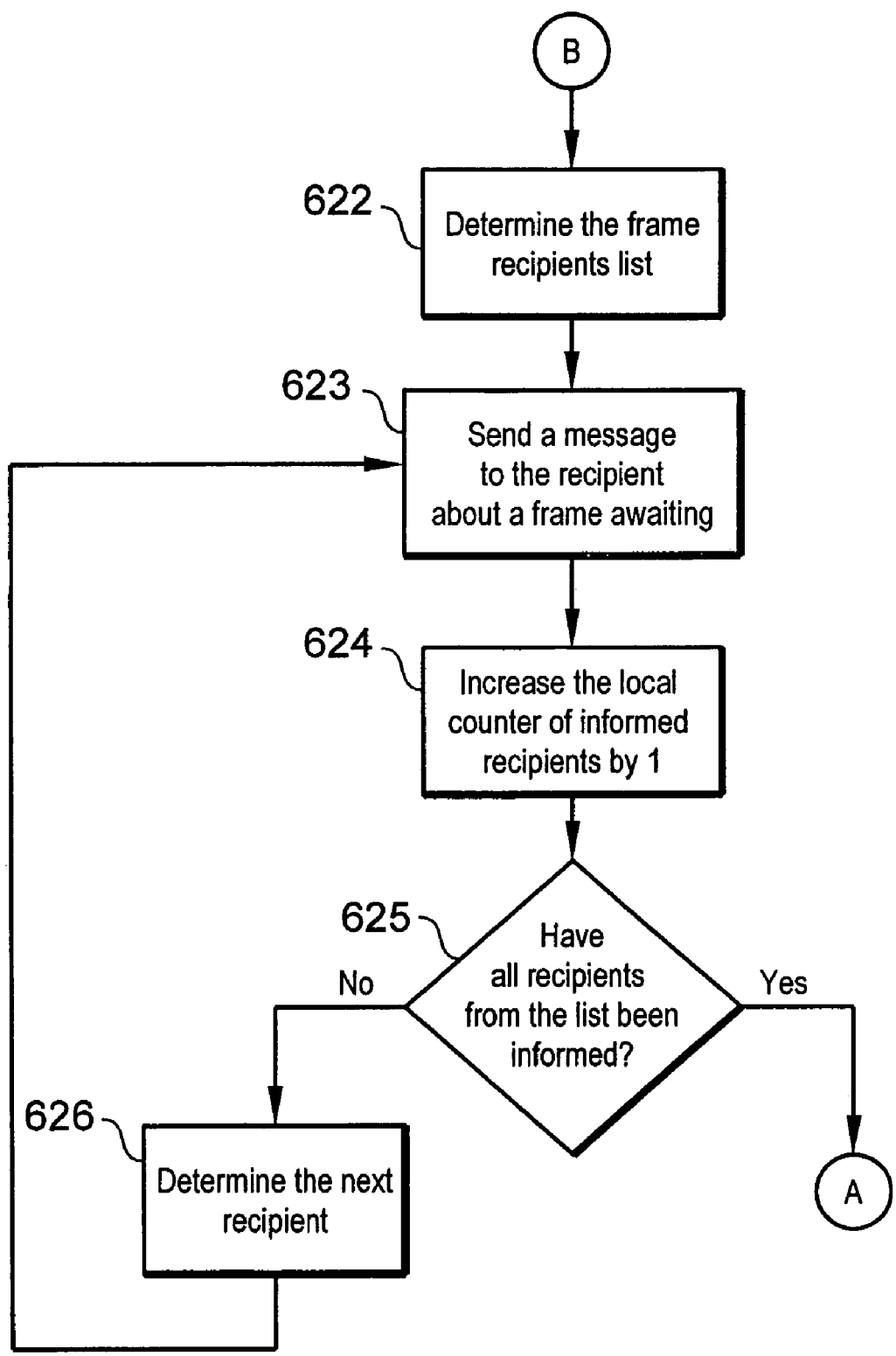

The procedure for transmitting data from the interface to the cable network is illustrated in FIGS. 7A, and 7B. In step 601 the interface of the device requests access to the output buffer, transmitting a command of its reservation to the block managing the buffers. When the buffer is accessible, it receives a return parameter in the form of a pointer to the reserved buffer. The output buffer will be released at the time when the bridge transmits the frame to the MAC controller or when it turns out that the transmission of data from the bridge is blocked. In the following step 602, the interface copies the frame directly into the output buffer. The remaining part of the procedure is serviced by the block managing the buffers. Thus the type of the frame being transmitted is checked in step 603. If the frame is addressed to a single device (unicast), step 604 checks whether the transmitted frame is addressed to a device connected to a different interface. If that is the case or the frame is destined for various frames (multicast, broadcast), it is checked, in step 605, whether it is possible to transmit the data to the interfaces—enabling or blocking of data transmission is achieved by using an appropriate flag. If that is the case, the procedure requests access to the input buffer and when this buffer is accessible, it reserves it in step 606. It then copies the transmitted frame into this buffer in step 607. Next, in step 622, a list of recipients of this frame is specified by giving their MAC addresses. If the frame is addressed to a single device (unicast), the list will contain a single recipient. In the case when the frame is addressed to multiple devices (multicast, broadcast), the list will contain all the devices whose MAC addresses are accessible in the MAC/CPE table. In step 623, the check-and-associate function sends, to the first recipient on the list, the information (a pointer to a buffer) about the frame addressed to it and awaiting in the input buffer. The value in the counter of informed recipients is increased by 1 in step 624, and in step 625 the procedure checks whether all recipients from the list have been informed. If they were not, it goes on to the next recipient in step 626. When all the recipients are informed or if the frame is not sent to the interfaces, the procedure checks, in step 610, whether the frame can be sent to the LLC bridge (transmission of data to the bridge can be enabled or blocked using an appropriate flag). If so, the address of the buffer containing the awaiting frame is sent to the LLC bridge in step 612. When the bridge fetches the frame, the buffer is released to be used again. In step 611, if the frame has not been sent to the bridge, the buffer can also be released by the multiplexer of interfaces. In step 613 the reception of data from the input buffer is checked using the procedure shown in FIG. 7C.

Figure 7C:
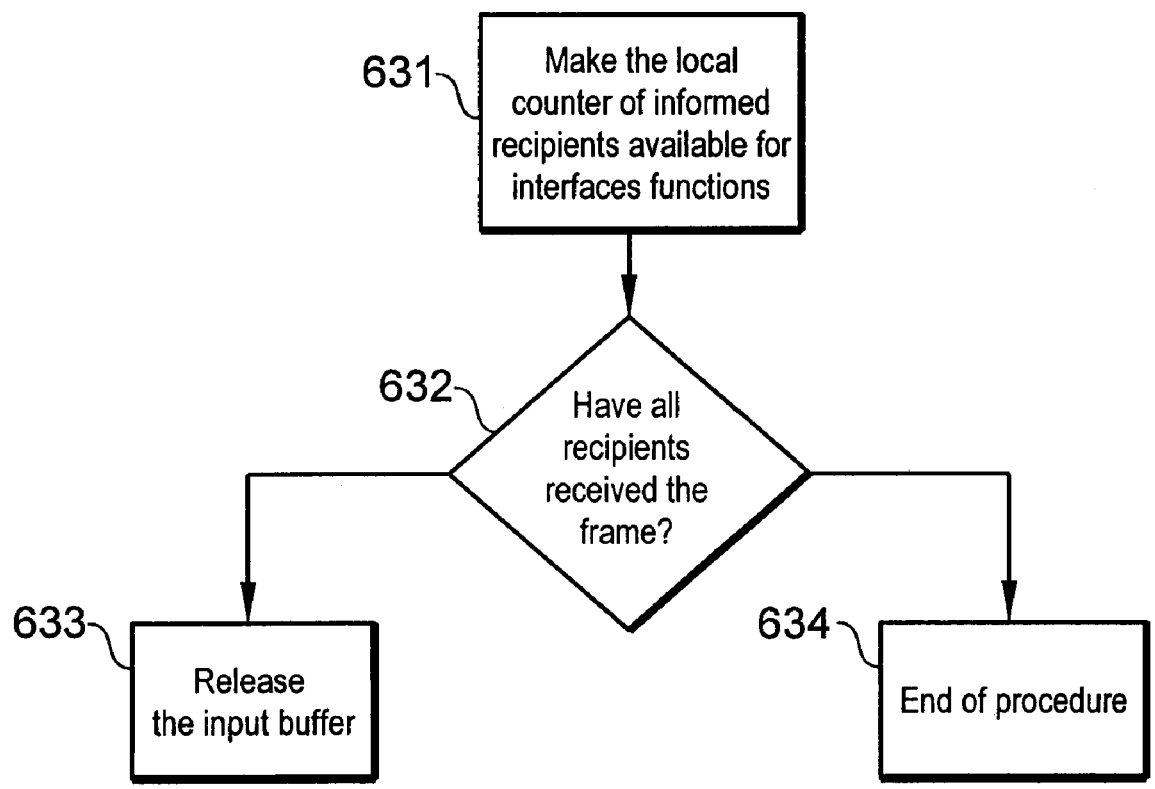

The procedure of checking the reception of data from the input buffer, shown in FIG. 7C, starts in step 631 from making the local counter of informed recipients available to interface functions. Next, in step 632, the value in the counter of informed recipients is compared to that of the counter of frame receipts to check whether all the recipients received their frames. If they did, the input buffer is released in step 633. If not, the procedure terminates in step 634, and the input buffer will be released by the last function fetching data from the buffer.

When the bridge receives a frame, it acts like a typical cable modem bridge, i.e. it directs the frame to the side of the cable network. Operation of the bridge is not relevant for this description.

The procedure of receiving data is presented on FIG. 8. In step 701, the bridge requests access to the input buffer and when it is accessible the bridge reserves it. The frame is then sent to the input buffer in step 702. Next, in step 703, the procedure of the buffers management block checks the frame type. If the frame is addressed to a single recipient (unicast), that frame recipient is determined in step 704 through his MAC address. The availability of the recipient is checked in the MAC/CPE table in step 705. If the recipient is accessible, information (a pointer to a buffer) about the awaiting frame is transmitted to the recipient in step 706 (using the check-and-associate and the identifying functions). The value in the counter of informed recipients is then increased by 1 in step 707. If the frame is addressed to multiple recipients (multicast/broadcast), a list of the recipients of the frame is defined in step 709. This list contains all the active MAC addresses. The first recipient on the list receives the information about the frame awaiting it in the input buffer in step 710. The value in the counter of informed recipients is then increased by 1 in step 711. In step 712, the procedure checks whether all the recipients have been informed. If they have not, it proceeds to the next recipient in step 713. When all the recipients have been informed, a check is performed in step 708 to see, whether the data from the input buffer were received. This is achieved through the procedure illustrated in FIG. 7C.

Figure 9:
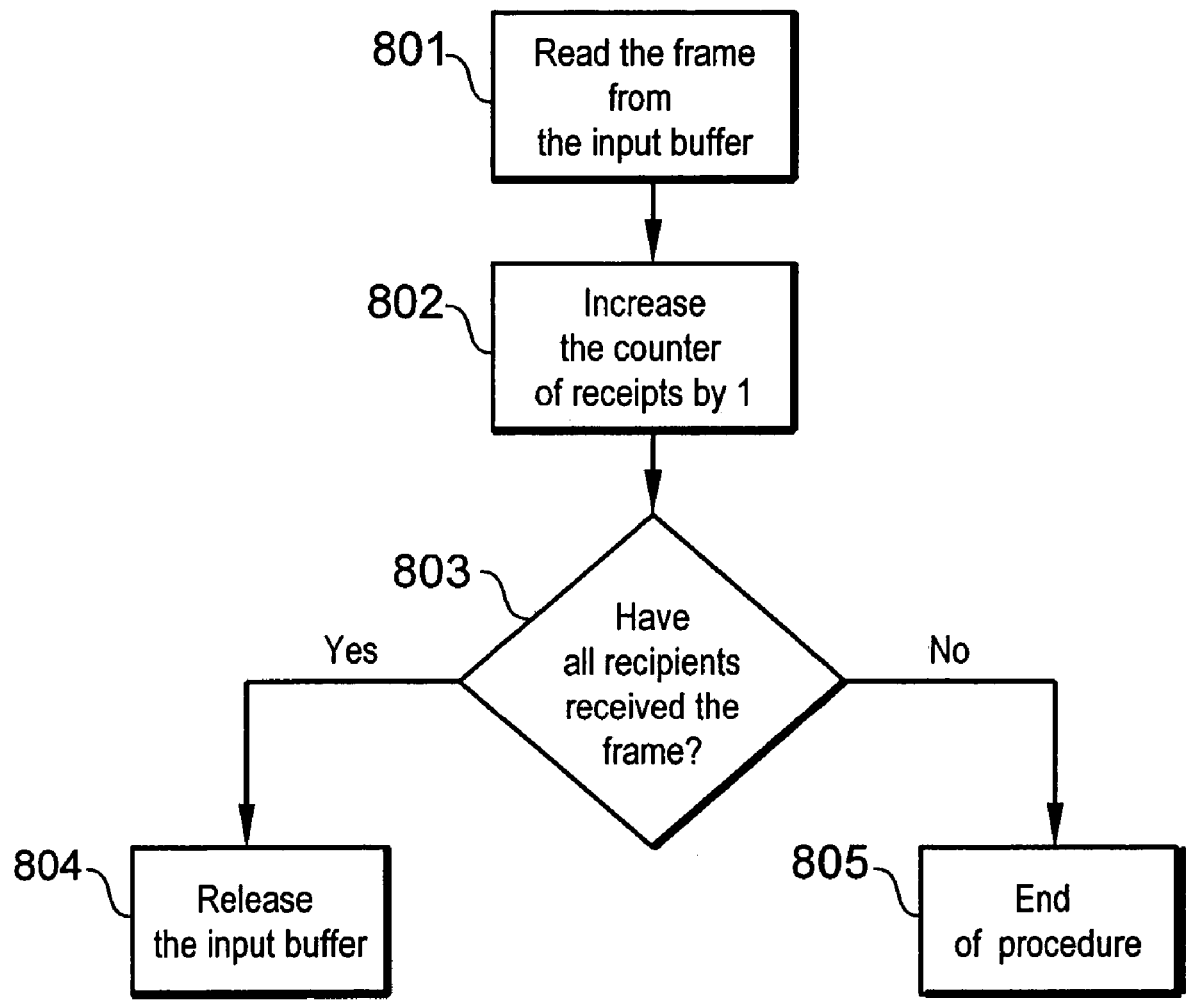

After the interface of the device is informed about the frame awaiting it in the input buffer—meaning it receives a pointer to that buffer—it invokes its frame-receiving procedure, as shown in FIG. 9. Thus in step 801 the procedure fetches a frame directly from the input buffer—knowing its address—and transmits the frame to the device. The value in the counter of frame receipts from that buffer is increased by 1 in step 802. Next, in step 803, the interface checks whether all the recipients received their frames by comparing the counter of informed recipients with the counter of frame receipts. This check takes place only if the counter of informed recipients was made available to this function. If it was not, the check is not performed. If all the recipients received their frames, that means that this was the last function to receive a frame and it releases the input buffer in step 804. If they have not, the procedure is terminated in step 805, and the input buffer will be released by a function of a different interface.

Figure 10:
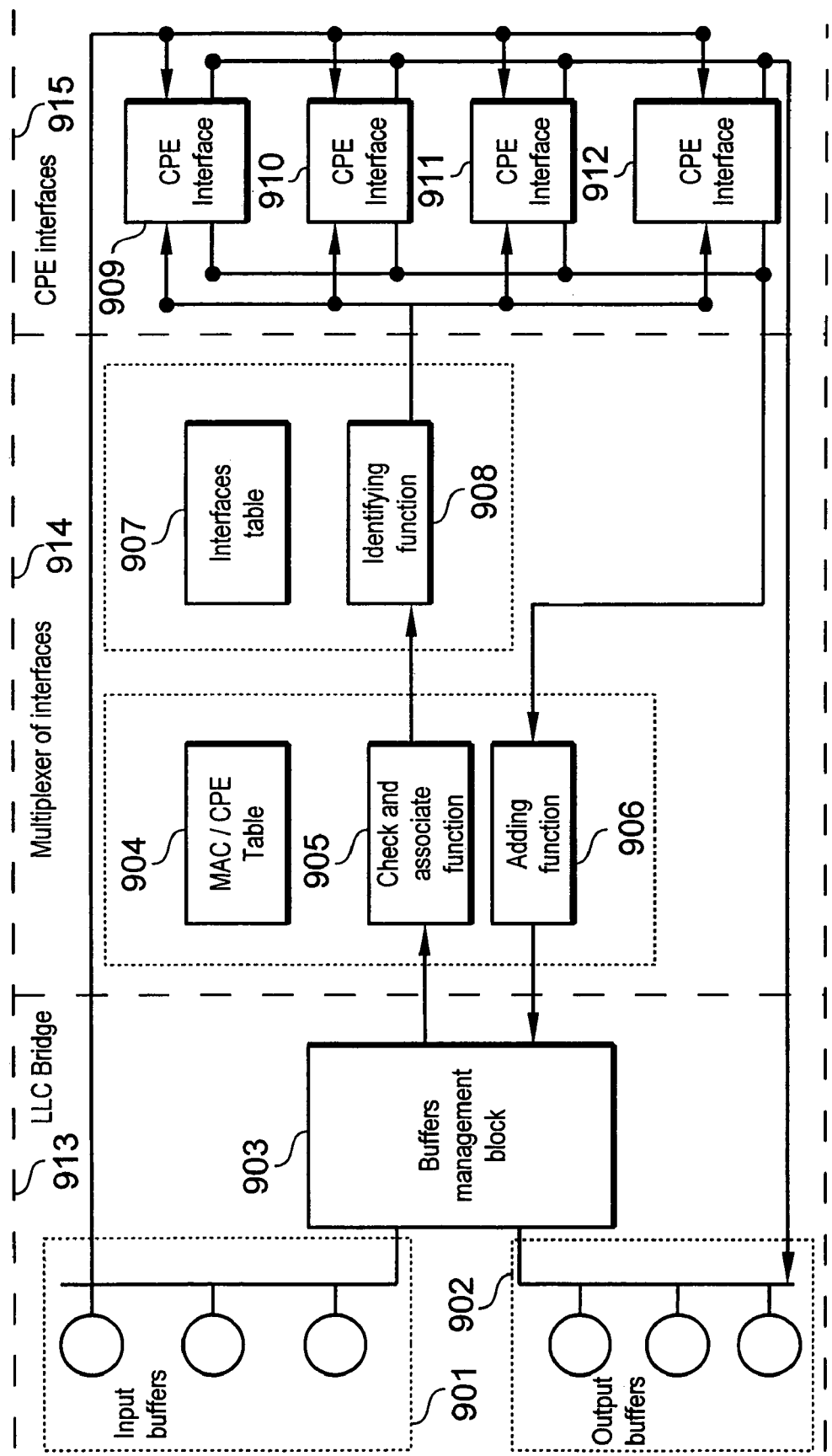
FIG. 10 shows a detailed structure of a part of a cable modem.

FIG. 10 shows the end part of the LLC bridge 913, the multiplexer of interfaces 914, and a set of CPE interfaces 915 connected to it. This set is made up of interfaces 909, 910, 911, and 912. The end part of the LLC bridge comprises a block of input buffers 901, storing data addressed to the CPE interfaces, a block of output buffers 902, storing data transmitted by the CPE interfaces and the buffer management block 903 executing the functions reserving and releasing buffers. The multiplexer of interfaces 914 comprises the MAC/CPE table 904 and a check-and-associate function, which checks in the MAC table if a device with the MAC address given in the frame is connected to the modem. If it is, the checking function transmits the frame along and if there is no such device, the function rejects the frame. Another component of the multiplexer of interfaces 914 is the adding function 906, which analyzes the information coming in from the CPE interfaces, checking if the sender's MAC address figures in the MAC table. If it does not, the adding function adds it to the MAC table. The multiplexer of interfaces 914 also contains a table of interfaces 907 as well as an identifying function 908 which—based on the CPE identifier transmitted by the check-and-associate function 905—draws from the table of interfaces 907 data identifying a given interface and transmits to it appropriate information.

Figure 11:
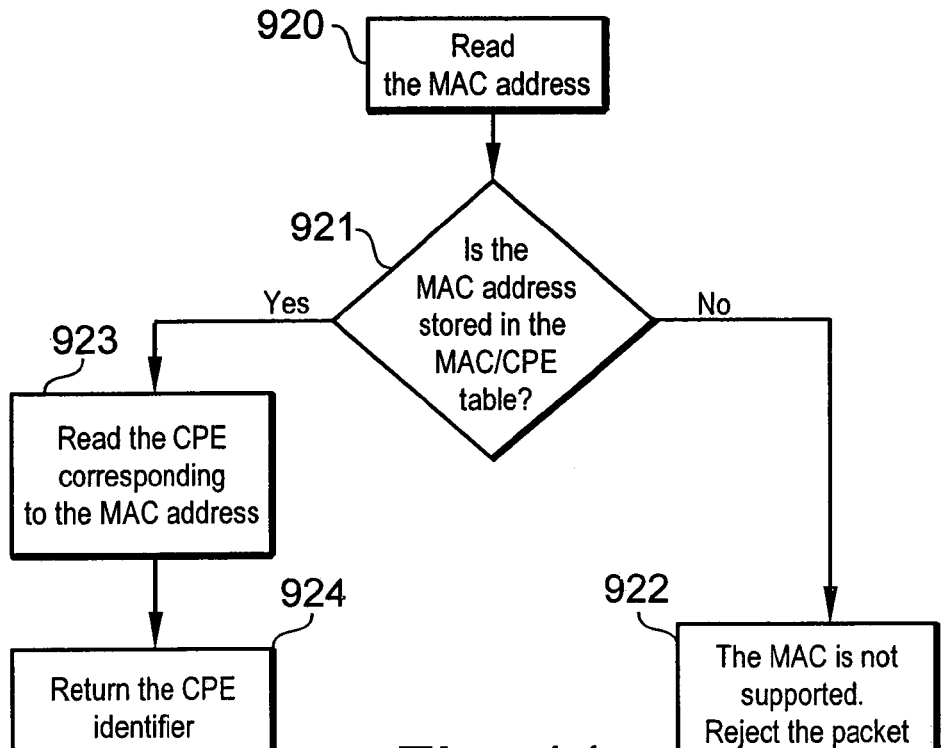
FIG. 11 shows a flow chart of a check-and-associate function.

A flow diagram of the check-and-associate function is shown in FIG. 11. As an input parameter, in step 920, this function reads the MAC address to which the frame is addressed. Next, in step 921, it checks the MAC/CPE table if it contains a record of such a MAC address. If it does not, this means that the given MAC address is not serviced by the multiplexer of interfaces, which in turn means that the multiplexer does not see a device with such a MAC address, and the frame is rejected in step 922. In the case when the function does read the CPE interface identifier to which the device with the given MAC address is connected, the CPE identifier is read in step 923. This identifier is then returned in step 924, which in turn allows for the transmitting of the information to the appropriate interface.

Figure 12:
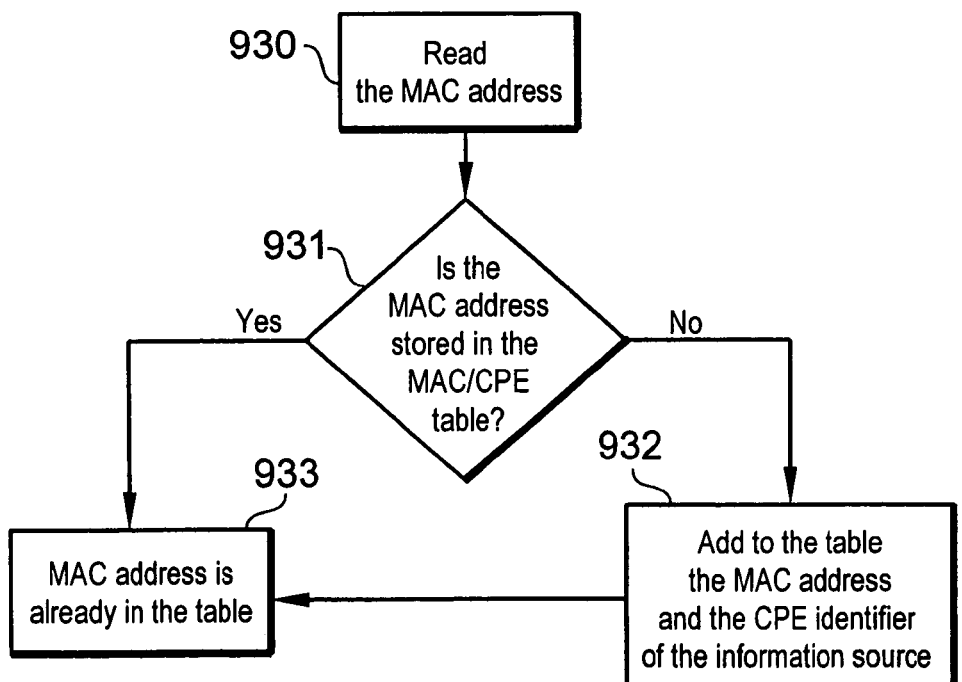
FIG. 12 shows a flow chart of an adding function.

A flow diagram of the adding function, analyzing the information transmitted from the CPE interfaces to the LLC bridge, is shown in FIG. 12. The MAC address of the sender is read from every transmitted information in step 930. Then in step 931, a check is made if that MAC address figures in the MAC/CPE table. If it does not, it is added to the table in step 932, along with information of which CPE interface this frame originated from. If the MAC address already figures in the table, no action takes place in step 933.

Figure 13:
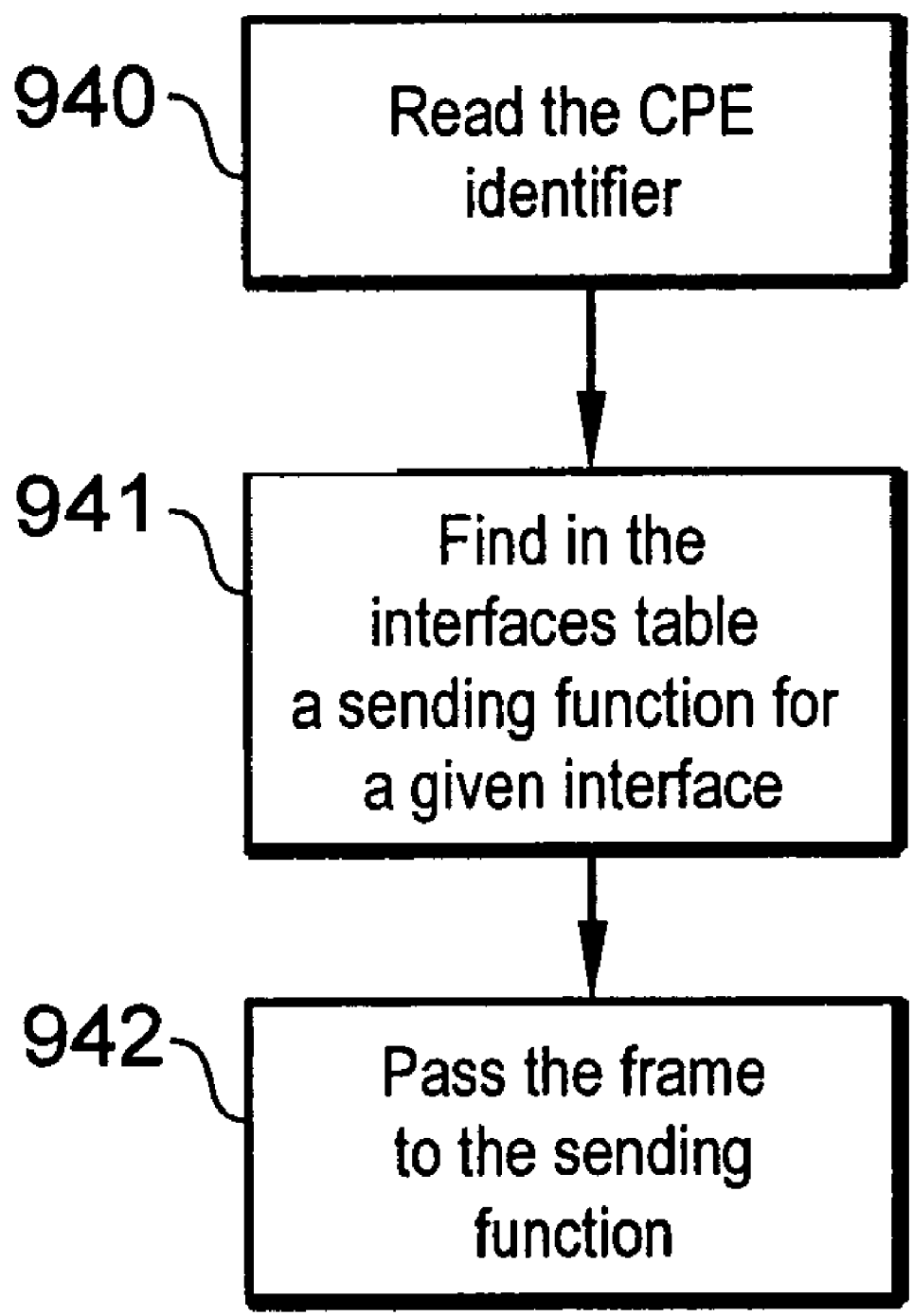
FIG. 13 shows a flow chart of an identifying function.

FIG. 13 shows the identifying function, which in step 940 reads the identifier of the CPE for which the transmitted frame is destined. Next, in step 941, it locates the function of the given interface—which will send the data to that interface—in the table of interfaces (containing information concerning registered interfaces). Finally in step 924, it transmits the frame to that function, which then transmits it to the given interface.

Information in the modem is sent along various paths, depending on the type of information that is being transmitted. Notices concerning frames destined for a specified MAC, awaiting in a specified buffer, are sent along the path from the input buffers through the managing block and the check-and-associate function to the CPE interface. Data fetched by the interfaces from a specified buffer is transmitted directly between the input buffers and the CPE interfaces. Buffer reservation requests and notices of a buffer being released (bypassing the adding function) are transmitted along the path from the CPE interfaces, through the adding function and the managing block to the output buffers. Data transmitted by the interfaces to a specified buffer is transmitted directly between the output buffers and the CPE interfaces.

The solution presented above allows for connecting any number of interfaces of various physical devices directly to the modem. These may include, for example, PC computers or cable TV decoders and may be connected through USB, Ethernet or serial ports. The above solution also allows for direct connection of virtual devices—such as applications servicing the flow of control frames through a network.

The preferred embodiments having been thus described, it will now be evident to those skilled in the art that further variation thereto may be contemplated. Such variations are not to be regarded as a departure from the invention, the true scope of the invention being set forth in the claims appended hereto.

What is claimed is:

1. A cable modem for connecting Customer Premises Equipment (CPE) devices comprising
    a Media Access Control (MAC) layer controller;
    a Logical Link Control (LLC) bridge interacting with the MAC layer controller;
    an Internet Protocol (IP) stack processing IP frames and interacting with the LLC bridge;
    CPE interfaces, each CPE interface communicating with one associated CPE device; and
    a multiplexer of CPE interfaces linked to the CPE interfaces and to the LLC bridge wherein the multiplexer has
    a table comprising data related to the CPE interfaces, the data being used by an identification function to determine an interface, to which a data frame with a specific receiver physical address is directed, and a table with MAC addresses of CPE devices and identifiers of the CPE interfaces wherein each interface identifier is determined by a check-and-associate function, and wherein records to the table with MAC addresses are added using an adding function, which analyses commands sent by the CPE interfaces to the multiplexers;

wherein the multiplexer enables transfer of data between the LLC bridge and the CPE interfaces and wherein each of the CPE interfaces is an application and controls flow of data between the multiplexer and the associated CPE device.

2. The cable modem according to claim 1, wherein the table comprising data related to the CPE interfaces comprises a name of the device of the CPE, an ID number of the device of the CPE and a MAC address of the device of the CPE.

3. A method for controlling flow of data between a cable modem and Customer Premises Equipment (CPE) devices linked to the cable modem equipped with a Logical Link Control (LLC) bridge and a multiplexer of CPE interfaces having an input buffer and an output buffer comprising providing the multiplexer of CPE interfaces with a table of interfaces comprising data enabling identification of the interfaces by a Media Access Control (MAC) address;

using the table of CPE interfaces by an identifying function to determine a CPE interface, to which a frame is to be transmitted via a sending function;

controlling the input buffer by creating a list of recipient CPE interfaces to which the frame is directed;

informing the recipient CPE interfaces about the frame in the input buffer;

increasing by one a counter of informed recipient CPE interfaces when any one of the recipient CPE interfaces receives the frame;

increasing by one a counter of received frames for each frame received by any one of the recipient CPE interfaces; and determining that the frame is received by all recipient CPE interfaces when the counter of received frames reaches the counter of informed recipient CPE interfaces.

4. The method for controlling flow of data according to claim 3 further comprising transmitting outgoing data from the cable modem through the CPE interface to the output buffer;

checking if the outgoing data is also directed to another CPE interface;

reserving the input buffer;

sending the outgoing data to the input buffer when the outgoing data is directed to another CPE interface canceling reservation of the input buffer when the outgoing data is received from the input buffer by all CPE interfaces, to which it was directed.

5. The method for controlling flow of data according to claim 3 further comprising reserving the input buffer;

transmitting incoming data through the LLC bridge to the input buffer; and canceling reservation of the input buffer when the incoming data is received from the input buffer by interfaces, to which it was directed.

6. A cable modem for connecting Customer Premises Equipment (CPE) devices, the cable modem comprising a Media Access Control (MAC) layer controller;

a Logical Link Control (LLC) bridge interacting with the MAC layer controller;

an Internet Protocol (IP) stack processing IP frames and interacting with the LLC bridge;

CPE interfaces, each CPE interface communicating with one associated CPE device; and a multiplexer of CPE interfaces linked to the CPE interfaces and to the LLC bridge wherein the multiplexer has a table of the CPE interfaces with data related to the CPE interfaces, the data being used by an identification function to determine CPE interface belonging to the CPE interfaces, to which an IP frame with a specific receiver physical address is directed, and a table with MAC addresses of devices of the CPE and identifiers for identifying the CPE interfaces wherein an identifier of CPE interface is determined by a check-and-associate function, and wherein records to the table with MAC addresses are added using an adding function, which analyses commands sent by the CPE interfaces to the multiplexer; CPE devices, with a specific MAC address, linked to given CPE interfaces, where the identifier of a CPE interface is determined by a check-and-associate function, and records to the table with MAC addresses are added using an adding function, which analyses commands sent by the CPE interfaces to the multiplexer;

wherein the multiplexer enables transfer of data between the LLC bridge and one of the CPE interfaces; and wherein each of the CPE interfaces is an interface of a virtual CPE device and operates dependent on received IP frames and controls flow of data between the multiplexer and the associated CPE device.

* * * * *